(12) United States Patent
Jiang et al.

(10) Patent No.: US 12,432,831 B2
(45) Date of Patent: Sep. 30, 2025

(54) LIGHTING APPARATUS

(71) Applicant: LEEDARSON LIGHTING CO.,LTD., Fujian (CN)

(72) Inventors: Hongkui Jiang, Fujian (CN); Qingyue Liao, Fujian (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 218 days.

(21) Appl. No.: 18/142,701

(22) Filed: May 3, 2023

(65) Prior Publication Data
US 2023/0363064 A1 Nov. 9, 2023

(30) Foreign Application Priority Data

May 9, 2022 (CN) .......................... 202221097576.0

(51) Int. Cl.
*H05B 45/30* (2020.01)
*H02M 7/06* (2006.01)
*H05B 45/10* (2020.01)
*H05B 45/37* (2020.01)
*H05B 45/40* (2020.01)
*H05B 47/155* (2020.01)
*H05B 47/175* (2020.01)

(52) U.S. Cl.
CPC ............. *H05B 45/37* (2020.01); *H02M 7/06* (2013.01); *H05B 45/10* (2020.01); *H05B 45/40* (2020.01); *H05B 47/155* (2020.01); *H05B 47/175* (2020.01)

(58) Field of Classification Search
CPC ........ H05B 45/10; H05B 45/20; H05B 45/30; H05B 45/37; H05B 47/10; H05B 47/105; H05B 47/155; H05B 47/175; H05B 47/19; H02M 7/06
See application file for complete search history.

(56) References Cited

U.S. PATENT DOCUMENTS 12,048,077 B2 * 7/2024 Miskin .................. H05B 45/50
2021/0329762 A1 * 10/2021 Liu ........................ H05B 45/18

* cited by examiner

*Primary Examiner* — Long Nguyen
(74) *Attorney, Agent, or Firm* — LANWAY IPR SERVICES; Chun-Ming Shih

(57) ABSTRACT

A lighting apparatus includes rectifier, current source and multiple LED module. The rectifier converts an alternative current source to a direct current. The current source receives the direct current to generate a first driving current, a second driving current and a third driving current according to a control command received from a serial communication channel. Each LED module of the multiple LED modules has a package frame and a LED chip. At least three different fluorescent powders are filled in the package frame so that each LED module emits a first light, a second light and a third light from three light areas above the LED chip.

18 Claims, 10 Drawing Sheets

LIGHTING APPARATUS

FIELD

The present invention is related to a lighting apparatus, and more particularly related to a lighting apparatus with a flexible configuration.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

LED (Light Emitting Diode) technology was first discovered in 1907 by a British scientist named H. J. Round, but it wasn't until the 1960s that practical LEDs were developed. LED technology has since come a long way, and it is now a popular lighting solution due to its energy efficiency, durability, and versatility.

LEDs work by using a semiconductor to produce light when an electric current is applied. The color of the light produced depends on the materials used in the semiconductor. In the early days, LEDs were mostly used as indicator lights in electronic devices, but advancements in technology have made it possible to produce bright and efficient LED lights for a variety of applications.

LED technology has several advantages over traditional incandescent and fluorescent lighting. LEDs are more energy-efficient, producing more light per watt of power consumed. They also last longer, with an average lifespan of 50,000 hours, compared to the 1,000 to 2,000 hours of incandescent bulbs. LEDs are also more durable, as they are not made of fragile glass and can withstand shock and vibration. Additionally, LEDs can be designed to emit a specific color and can be dimmed or brightened as needed, making them highly versatile.

LED technology has now become ubiquitous in our everyday lives, from lighting our homes and offices to illuminating our streets and highways. It has also enabled the development of innovative new products, such as flexible displays and wearable technology.

LED (Light Emitting Diode) technology has revolutionized the lighting industry. There are several advantages to using LED technology on light devices.

First, LEDs are highly energy-efficient, converting most of the electrical energy they consume into light. They use up to 90% less energy than traditional incandescent bulbs, which means lower electricity bills and a reduced carbon footprint. This can translate into significant cost savings for individuals and businesses.

Second, LEDs have an average lifespan of 50,000 hours, which is significantly longer than traditional bulbs. This means that they need to be replaced less frequently, reducing maintenance costs and inconvenience. This also means that LED lights can last for years without needing to be replaced, which can save money and reduce waste.

Third, LEDs are highly durable and resistant to shocks and vibrations. They are made from solid-state materials that are less prone to damage than traditional bulbs, which are made of glass. This makes them ideal for use in outdoor lighting, where they can withstand harsh weather conditions.

Fourth, LEDs can be designed to emit light in a wide range of colors and intensities, making them highly versatile. They can also be used in a variety of applications, from backlighting to full illumination. This makes them ideal for use in a wide range of industries, from entertainment to healthcare.

Finally, LEDs turn on instantly, without the warm-up time required by traditional bulbs. This means that they can be used in situations where quick, reliable lighting is required, such as emergency lighting or in applications where lights need to be turned on and off frequently.

In conclusion, the advantages of using LED technology on light devices are many, including energy efficiency, long lifespan, durability, versatility, and instant-on capabilities. These benefits make LEDs a popular choice for a wide range of applications, from residential and commercial lighting to automotive and industrial lighting.

Despite the many advantages of LED technology, there is still room for improvement in the design and implementation of LED-based lighting systems. By addressing some of the challenges associated with LED lighting, we can create even more efficient and effective lighting solutions that can improve people's lives.

In conclusion, while LED technology has already transformed the lighting industry, there is still much to be done to improve the design and implementation of LED-based lighting systems. By addressing the challenges associated with LED lighting and improving its capabilities, we can create even better lighting solutions that can improve people's lives in countless ways.

To make the lighting devices more usual, it is beneficial to continue improvements on both cost and flexibility of lighting devices.

SUMMARY

In some embodiments, a lighting apparatus includes rectifier, current source and multiple LED module.

The rectifier converts an alternative current source to a direct current.

The current source receives the direct current to generate a first driving current, a second driving current and a third driving current according to a control command received from a serial communication channel.

Each LED module of the multiple LED modules has a package frame and a LED chip. At least three different fluorescent powders are filled in the package frame so that each LED module emits a first light, a second light and a third light from three light areas above the LED chip.

There are three package electrodes corresponding to the three light areas respectively for receiving the first driving current, the second driving current and the third driving current.

In some embodiments, the lighting apparatus may also include a controller coupled to the current source via the serial communication channel.

The controller sends an receiver address signal associated with the current source via the serial communication channel.

The current source sends a confirmation signal to the serial communication channel when receiving the receiver address.

The controller divides the control command into multiple data parts and sends the multiple data parts in sequence to the current source via the serial communication channel.

In some embodiments, the current source sends a data success signal associated to each data part to the controller via the serial communication channel if the current source successfully receives the corresponding data part.

In some embodiments, the controller resends the data part if not receiving the corresponding data success signal.

In some embodiments, the current source has a decoder for decoding the control command after receiving the data parts of the control command.

The decoder finds a current ratio among the first driving current, the second driving current and the third driving current corresponding to a light parameter indicated by the control command.

In some embodiments, the first light, the second light and the third light from the three light areas have different colors.

The light parameter indicates a mixed color of a mixed light by the first light, the second light and the third light.

In some embodiments, a wireless module is coupled to the serial communication channel.

The wireless module and the current source have different receiver addresses in the serial communication channel.

In some embodiments, the wireless module sends the control command via the serial communication channel to the current source.

In some embodiments, the decoder adopts the control command from the wireless module in priority than the control command received from the controller.

In some embodiments, the controller translates a switch status of a manual switch to determine the control command.

In some embodiments, the decoder continues to use the current ratio to generate the first light driving current, the second light driving current and the third light driving current if no new control command is received.

In some embodiments, the multiple LED modules are disposed on a light source plate.

Each of the three electrodes of one said LED module is serially connected to a corresponding electrode of another said LED module.

In some embodiments, there are three connecting wires arranged in parallel on the light source for respectively connecting the electrodes of the one said LED module and the another said LED module.

In some embodiments, the light areas of the multiple LED modules are arranged in a scattered pattern on a light source plate.

In some embodiments, the first light, the second light and the third light of the light areas of the LED module are a red light, a blue light and a green light.

In some embodiments, there at least two LED modules emitting the red lights with different color temperatures.

In some embodiments, the package frame has separators for separating the fluorescent powders for decreasing interference among the red light, the blue light and the green light.

In some embodiments, the rectifier, the current source and the LED modules are disposed on a same light source plate.

In some embodiments, the lighting apparatus may also include a reference light source.

The reference light source emits a reference light with a different color temperature from a mixed light of the first light, the second light and the third light.

In some embodiments, a first light intensity of the reference light source is kept constant and a second light intensity of the LED modules is varied to achieve different color temperatures of the lighting apparatus.

DETAILED DESCRIPTION

Figure 1:
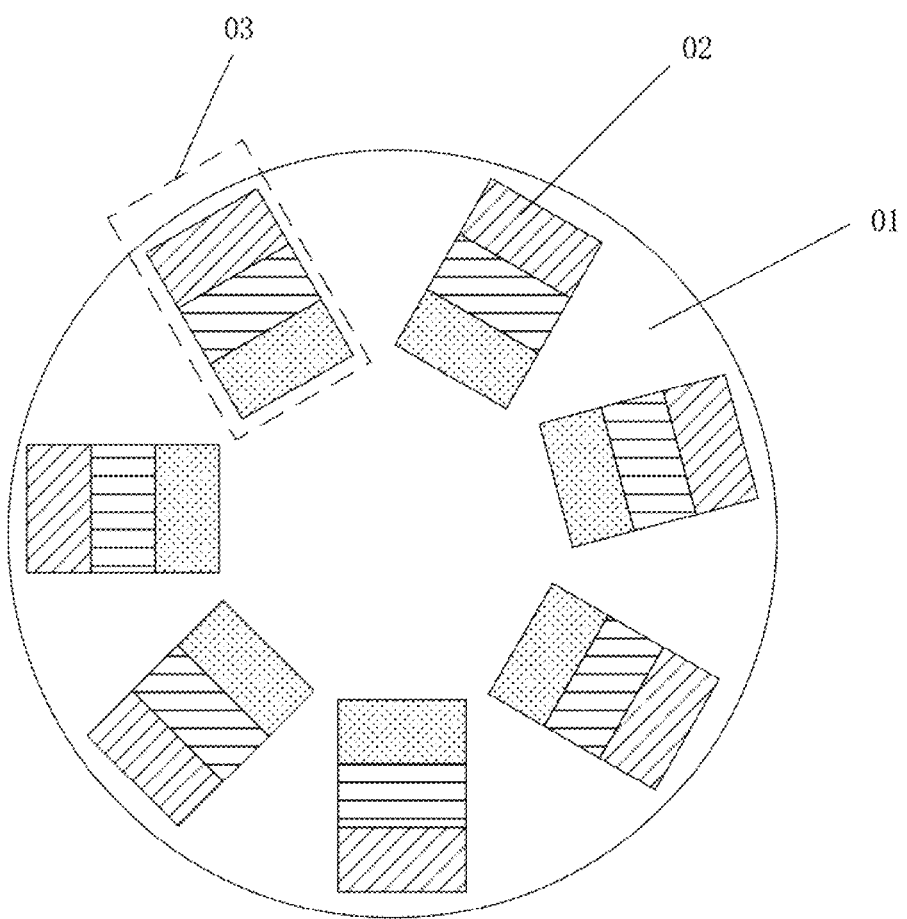
FIG. 1 illustrates a LED modules arrangement pattern.
Figure 2:
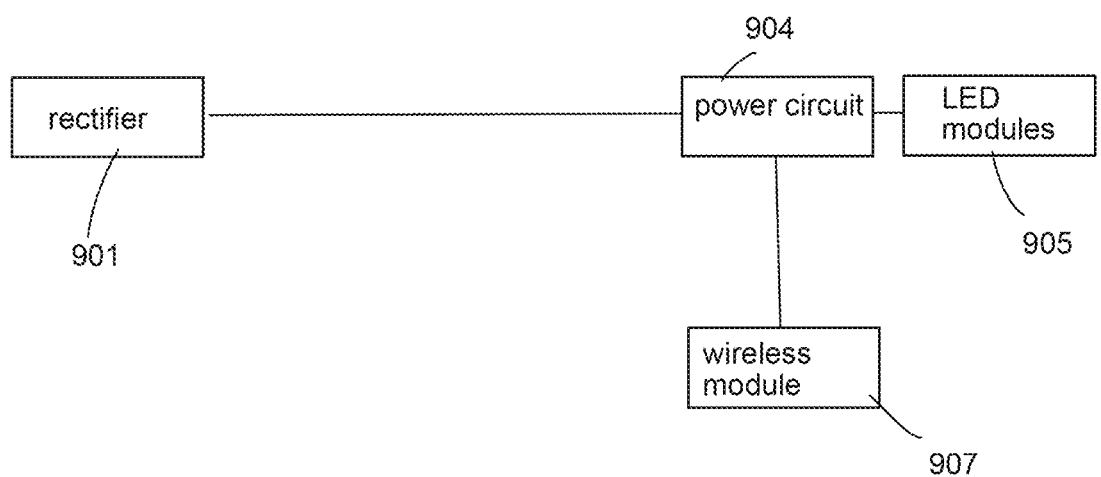
FIG. 2 illustrates a circuit block diagram of an embodiment.
Figure 3:
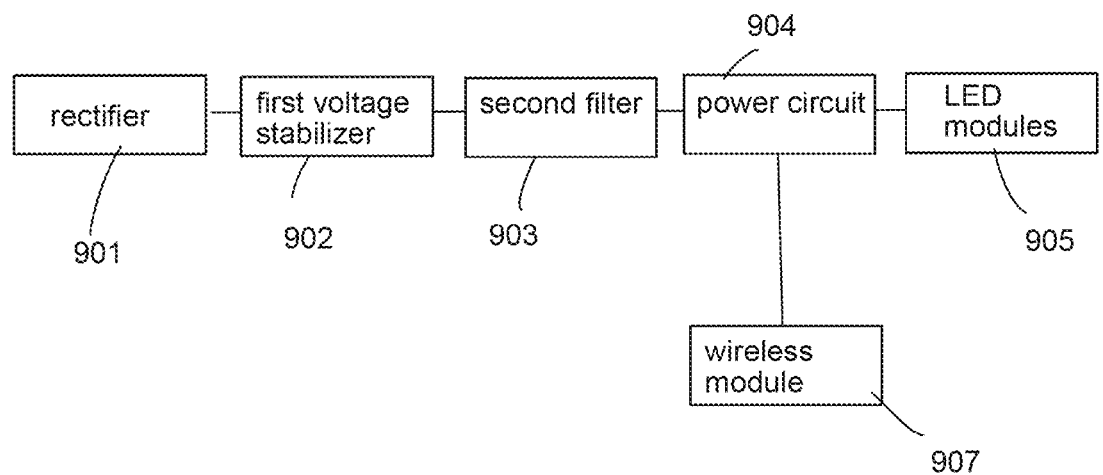
FIG. 3 illustrates a circuit block diagram of another embodiment.
Figure 4:
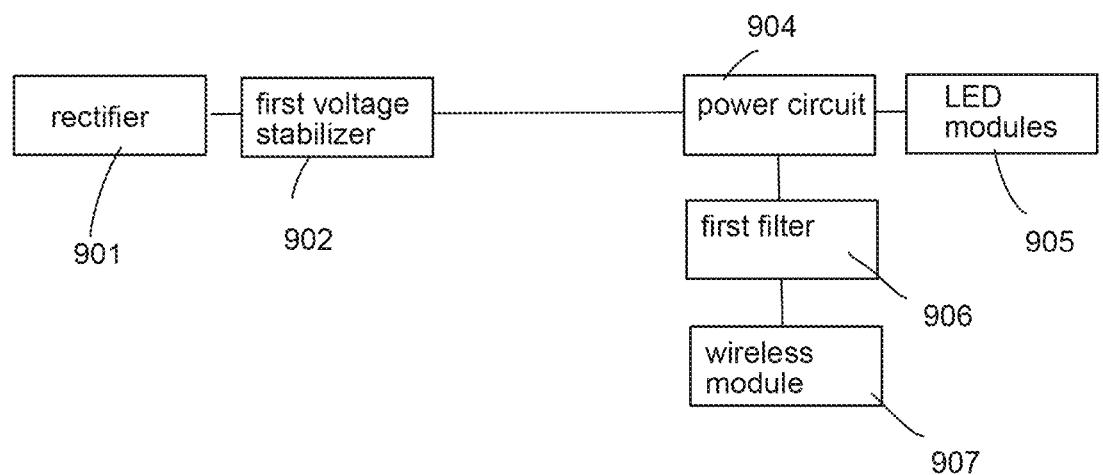
FIG. 4 illustrates a circuit block diagram of another embodiment.
Figure 5:
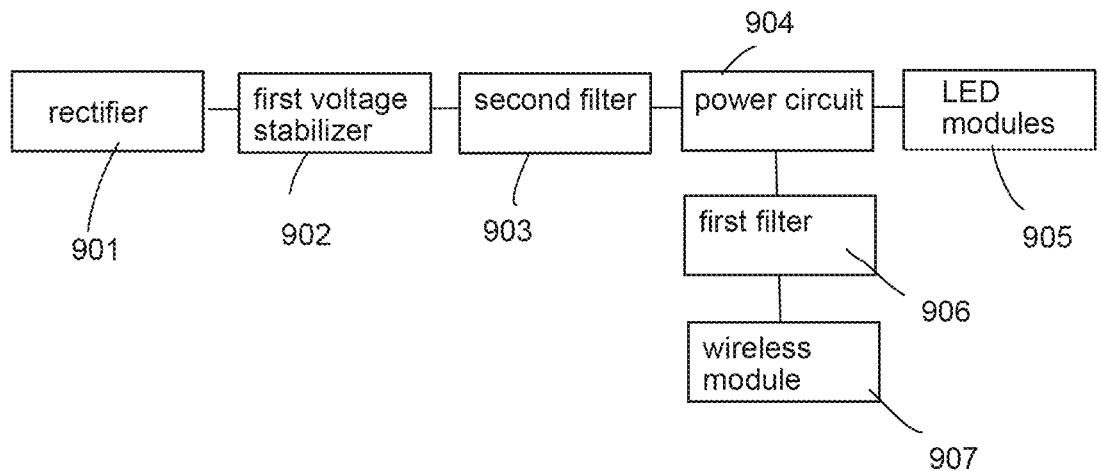
FIG. 5 illustrates a circuit block diagram of another embodiment.

In some embodiments, a lighting apparatus includes rectifier 601, current source 602 and multiple LED modules 603, 604.

The rectifier 601 is an electronic device that is used to convert alternating current (AC) to direct current (DC). The process of converting AC to DC is known as rectification. A rectifier is commonly used in power supplies and electronic devices that require DC voltage to operate.

The rectifier may include following components.

Diodes: a diode is a semiconductor device that allows current to flow in only one direction. When AC voltage is applied to a diode, it conducts only during the positive half-cycle of the AC waveform, allowing only positive voltage to pass through, while blocking the negative voltage. This results in a pulsating DC waveform.

Bridge rectifiers: A bridge rectifier is a circuit that uses four diodes arranged in a bridge configuration to convert AC to DC. It provides a full-wave rectification, which means that both halves of the AC waveform are used to produce a DC voltage. This results in a smoother DC waveform compared to a single diode rectifier.

Capacitors: A capacitor is an electronic component that can store electrical charge. In a rectifier circuit, a capacitor is often used to smooth out the pulsating DC voltage produced by the diodes or bridge rectifier. The capacitor charges during the peaks of the DC waveform and discharges during the troughs, reducing the amount of ripple in the DC voltage.

Voltage regulators: A voltage regulator is an electronic component that maintains a constant DC output voltage, even when the input voltage or load current changes. It is often used in conjunction with a rectifier to provide a stable DC voltage for electronic devices. There are different types of voltage regulators, such as linear regulators and switching regulators.

Transformers: A transformer is an electrical device that is used to step up or step down the voltage of an AC power supply. It is often used in conjunction with a rectifier to provide a specific DC voltage for electronic devices. Transformers can also be used to isolate the electronic device from the AC power supply.

The current source 602 is an electronic circuit that provides a constant current output, independent of changes in load resistance or input voltage.

One way to implement the current source with an IC is by using an operational amplifier (op-amp). Op-amps can be used to implement a simple current source by connecting a resistor between the output and inverting input of the op-amp. The non-inverting input is connected to a voltage reference, such as a Zener diode or voltage regulator. The op-amp will adjust its output voltage to maintain a constant current through the resistor, providing a stable current source.

Another way to implement a current source with an IC is by using a transistor. A simple transistor-based current source can be implemented by connecting a resistor in series with the transistor's emitter and a voltage reference at the base. The transistor will adjust its collector current to maintain a constant voltage drop across the resistor, providing a stable current source.

Bandgap reference circuits are another popular way to implement a current source with an IC. These circuits use a combination of diodes and transistors to provide a stable reference voltage. A current source can be implemented by connecting a resistor in series with the output of the bandgap reference circuit. The voltage drop across the resistor will be proportional to the current, providing a stable current source.

IC current sources offer several advantages over discrete implementations, such as smaller size, better thermal stability, and higher precision. They are widely used in various applications, including sensor biasing, laser diode drivers, and battery charging circuits. The specific implementation of a current source with an IC will depend on the requirements of the circuit and the available components.

The rectifier 601 converts an alternative current source 6011 to a direct current 6012. For example, the alternative current is an indoor power source that is the electrical power supply used for indoor applications that operate at a voltage of 220 volts AC (alternating current). The voltage and frequency of the electrical power supply may vary depending on the country or region, but in many countries, such as in Europe, Asia, and Africa, the standard voltage for indoor AC power is 220V.

AC power is used to power a wide range of electrical and electronic devices, including lights, fans, appliances, computers, and other electronic equipment. In many countries, indoor 220V AC power is supplied through the electrical grid, which is a network of power lines and transformers that deliver electricity from power plants to homes and businesses.

The current source 602 receives the direct current to generate a first driving current, a second driving current and a third driving current according to a control command received from a serial communication channel 619.

The serial communication channel 619 refers to a type of communication channel that transmits data one bit at a time, in a sequential order. Multiple components may be coupled to the serial communication channel 619.

In the serial communication channel 619, the data is transmitted in a series of electrical or optical pulses that represent the binary digits (bits) of the data. The bits are transmitted one after another over a single wire or pair of wires, which simplifies the wiring and reduces the number of connections needed between the devices.

The serial communication channel 619 can be either synchronous or asynchronous. In synchronous serial communication, a clock signal is used to synchronize the data transmission between the devices. In asynchronous serial communication, the data is transmitted without a clock signal, and the receiver must infer the timing of the data based on the start and stop bits.

The serial communication channel 619 have several advantages over parallel communication channels, where multiple bits are transmitted simultaneously over multiple wires. Serial communication channels require fewer wires, which reduces the complexity and cost of the wiring. They also allow for longer distance transmission without signal degradation, as the signal is less affected by noise and interference.

Figure 9:
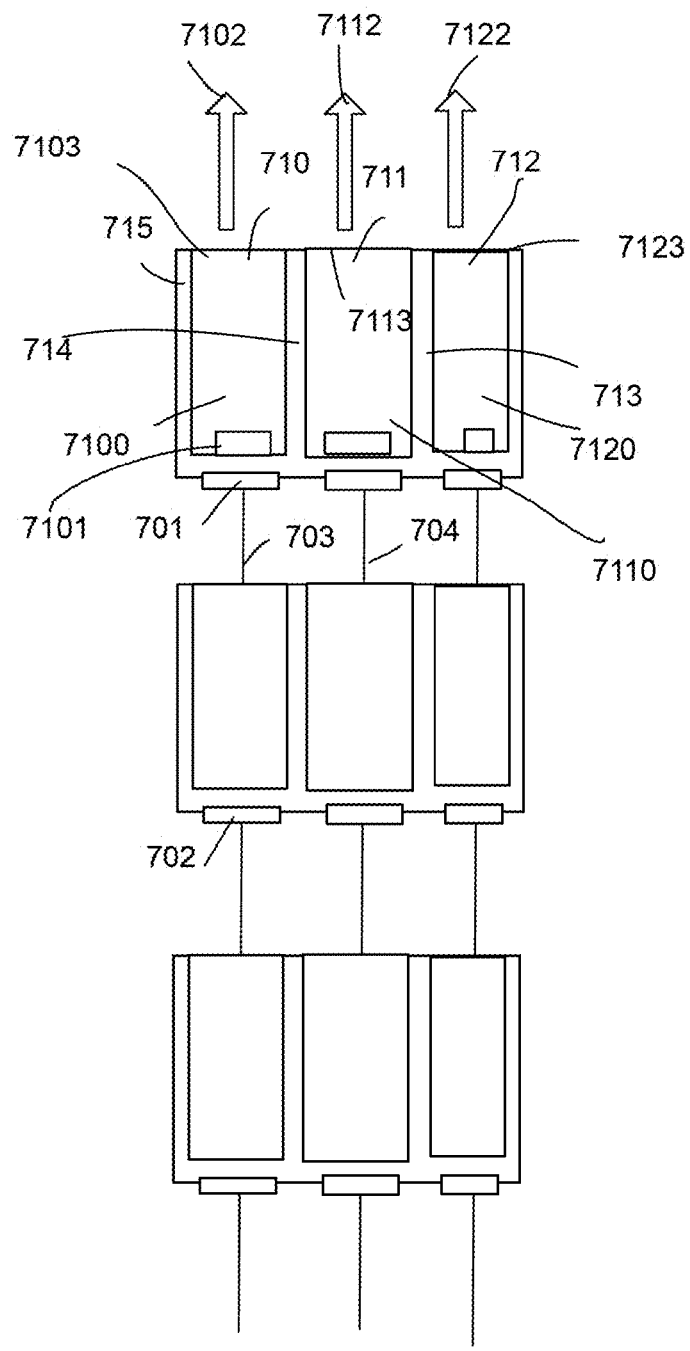
FIG. 9 illustrates a package frame example and how multiple LED modules are connected in series.

As illustrated in the example of FIG. 9, each LED module of the multiple LED modules has a package frame 715 and a LED chip 7101. At least three different fluorescent powders 7100, 7110, 7120 are filled in the package frame 715 so that each LED module emits a first light 7102, a second light 7112 and a third light 7122 from three light areas 7103, 7113, 7123 above the LED chip.

Please refer back to FIG. 8. There are three package electrodes 609, 610, 611 corresponding to the three light areas respectively for receiving the first driving current 612, the second driving current 613 and the third driving current 614.

In some embodiments, the lighting apparatus may also include a controller 621 coupled to the current source 602 via the serial communication channel 619.

The controller 621 sends an receiver address signal 617 associated with the current source 602 via the serial communication channel 619.

In other words, the current source 602 is identified by its receiver address. With such methods, multiple components may interact with each other with a flexible connection.

The current source 602 sends a confirmation signal 618 to the serial communication channel 619 when receiving the receiver address 617 to inform that the current source 602 is ready to receive data.

The controller 621 divides the control command 615 into multiple data parts 616, e.g. multiple bytes or bits and sends the multiple data parts 616 in sequence to the current source 602 via the serial communication channel 619.

In some embodiments, the current source 602 sends a data success signal 6181 associated to each data part 616 to the controller 621 via the serial communication channel 619 if the current source 602 successfully receives the corresponding data part 616.

If the controller 621 does not receive the data success signal 6181 after a time period, the controller 621 may retransmit the data again.

In some embodiments, the controller resends the data part if not receiving the corresponding data success signal.

In some embodiments, the current source has a decoder 6021 for decoding the control command 615 after receiving the data parts 616 of the control command 615.

The decoder 6021 finds a current ratio among the first driving current 612, the second driving current 613 and the third driving current 614 corresponding to a light parameter indicated by the control command 615.

For example, the control command 615 may indicates a color value, e.g. RGB=(12, 58, 121). The control command 615 is translated by the decoder 6021. The decoder 6021 finds a table that contains a list with data pairs that associate a color value with current ratios of the first driving current, the second driving current and the third driving current specific to the configuration of the LED modules used in the lighting apparatus.

Such data list may be created in a factory by engineers who design the lighting apparatus. When different LED modules are disposed, different driving current ratios may be set in the data list to correspond to a correct color value.

In some embodiments, the first light, the second light and the third light from the three light areas have different colors.

The light parameter indicates a mixed color of a mixed light by the first light, the second light and the third light.

In some embodiments, a wireless module 622 is coupled to the serial communication channel 619.

The wireless module 622 and the current source 60 have different receiver addresses in the serial communication channel 619 so that they may be installed flexibly.

In some embodiments, the wireless module 622 is not added while in some other cases, the controller 621 may be replaced directly by the wireless module 622.

In some embodiments, the wireless module 622 sends the control command via the serial communication channel 619 to the current source. The control command may be received by the wireless module 622 from an external device like a mobile phone or a remote control. The wireless module 622 may further translate the control command received from an external device to a suitable format to be used in the lighting apparatus.

The current source 602 may in addition have a power circuit that divides an input current to three or more parts to generate the driving currents mentioned above. The power circuit is controlled by the decoder 6021, e.g. sending PWM signals or power switches to divide an input current to multiple parts according to a desired current ratio.

In some embodiments, the decoder 6021 adopts the control command from the wireless module in priority than the control command received from the controller. For example, the lighting apparatus has a default operation mode with a first parameter, but if an external command is received and translated by the wireless module 622 to form the control command 615, the generated control command is taken as the parameter, not the default value.

In some embodiments, the controller 621 translates a switch status of a manual switch 620 to determine the control command. The manual switch 620 may be disposed on a housing surface of the lighting apparatus for a user to change a light parameter of the lighting apparatus. The manual switch 620 may provide a position or a resistor or other types of information for the controller 621 to translate into the control command 615.

In some embodiments, the decoder 6021 continues to use the current ratio to generate the first light driving current, the second light driving current and the third light driving current if no new control command is received.

Figure 10:
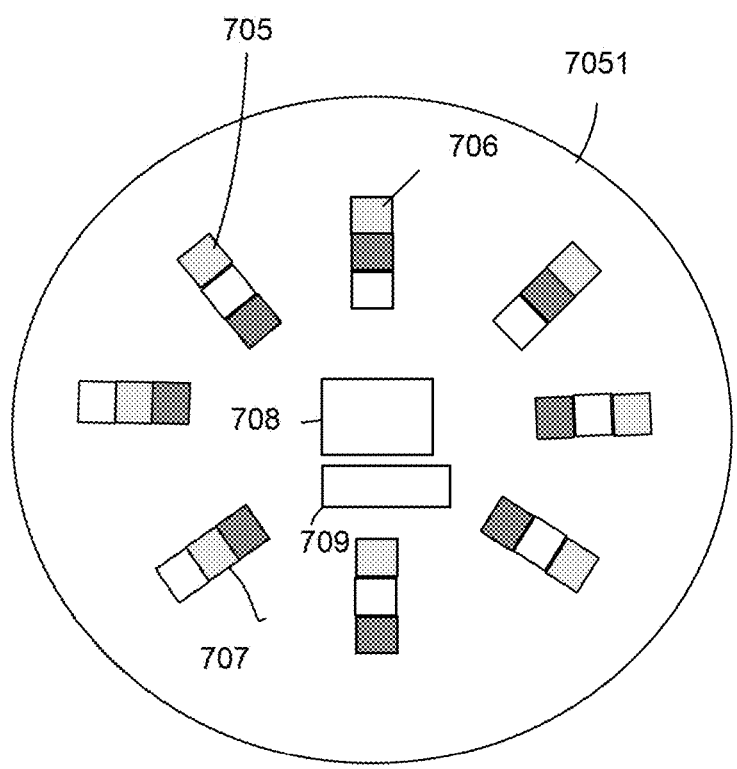
FIG. 10 illustrates a light source plate mounted with multiple components.

In FIG. 10, the multiple LED modules 705, 706, 707 are disposed on a light source plate 7051.

Each of the three electrodes of one said LED module is serially connected to a corresponding electrode of another said LED module.

FIG. 9 illustrates that the first electrode 701 of a LED module is connected in series to the first electrode 702 of another LED module. It may be applied the same manner for other electrodes so that the same color area of multiple LED modules are connected to the same power source, e.g. a first driving current.

In some embodiments, there are three connecting wires arranged in parallel on the light source for respectively connecting the electrodes of the one said LED module and the another said LED module.

FIG. 9 shows an example of such parallel arrangement. Please be noted that if the LED modules are arranged not in a linear arrangement, the parallel arrangement may refer to wires that are disposed without intersection on a plane, not necessary to be straight or with equal distance therebetween.

In some embodiments, the light areas of the multiple LED modules are arranged in a scattered pattern on a light source plate.

FIG. 10 shows three LED modules 705, 706, 707 with different color arrangement, and they are located in a random manner to prevent undesired light pattern.

In some embodiments, the first light, the second light and the third light of the light areas of the LED module are a red light, a blue light and a green light.

In some embodiments, there at least two LED modules emitting the red lights with different color temperatures. In other words, in addition to change color, the configuration may be used to mix different desired color temperature.

In some embodiments, the package frame has separators for separating the fluorescent powders for decreasing interference among the red light, the blue light and the green light.

FIG. 9 shows separators 714, 713 to separate fluorescent powders 7100, 7110, 7120.

In FIG. 10, the rectifier and the current source 708, the wireless module 709 and the LED modules 705, 706, 707 are disposed on a same light source plate 7051.

Figure 8:
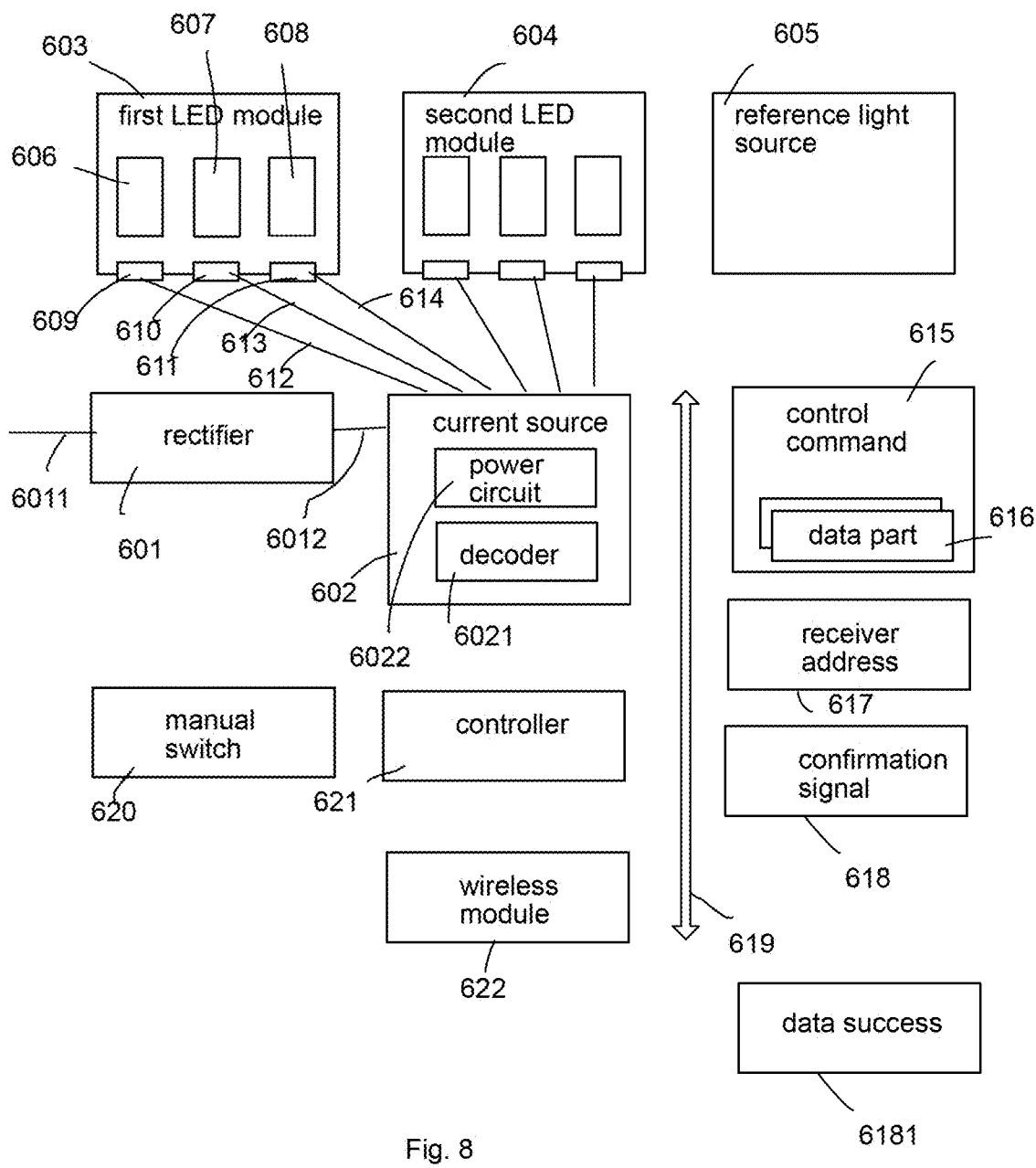
FIG. 8 illustrates another lighting apparatus embodiment.

In FIG. 8, the lighting apparatus may also include a reference light source 605.

The reference light source 605 emits a reference light with a different color temperature from a mixed light of the first light, the second light and the third light. For example, the reference light source 605 may emit a light of 2000K color temperature while the first light, the second light and the third light mix a light in 5000K. By adjusting the intensity ratio, a desired mixed color temperature may be obtained.

In some embodiments, a first light intensity of the reference light source is kept constant and a second light intensity of the LED modules is varied to achieve different color temperatures of the lighting apparatus. In other words, some part of the light source in the lighting apparatus is kept the same light intensity while the other part of the light source is changed. Such design makes the design compact while reserving flexibility.

Please refer to FIG. 1. In FIG. 1, There are three types of LED modules 01, 02, 03 disposed on a light source plate. Each LED module 01, 02, 03 has three areas for emitting three types of lights, e.g. different colors.

FIG. 2 to FIG. 5 illustrates different configuration of a driving circuit.

The same reference numeral in FIG. 2 to FIG. 5 refers to the same component.

In FIG. 2 to FIG. 5, a rectifier 901 converts AC power to DC power. The first voltage stabilizer 902 makes the output DC power stable to be more constant without big variations over time.

The second filter 903 further smooth the input DC power which is important particularly when there is wireless module 907 who also uses the generated DC power.

There is a first filter 906 to further reduce the variation of DC power supplied to the wireless module 907. The power circuit 904 handles the power transformation and supplies driving currents to the LED modules 905.

The rectifier 901 may be regarded as an example of the rectifier mentioned in above examples. The power circuit 904 may refer to the power circuit mentioned in above examples.

Figure 6:
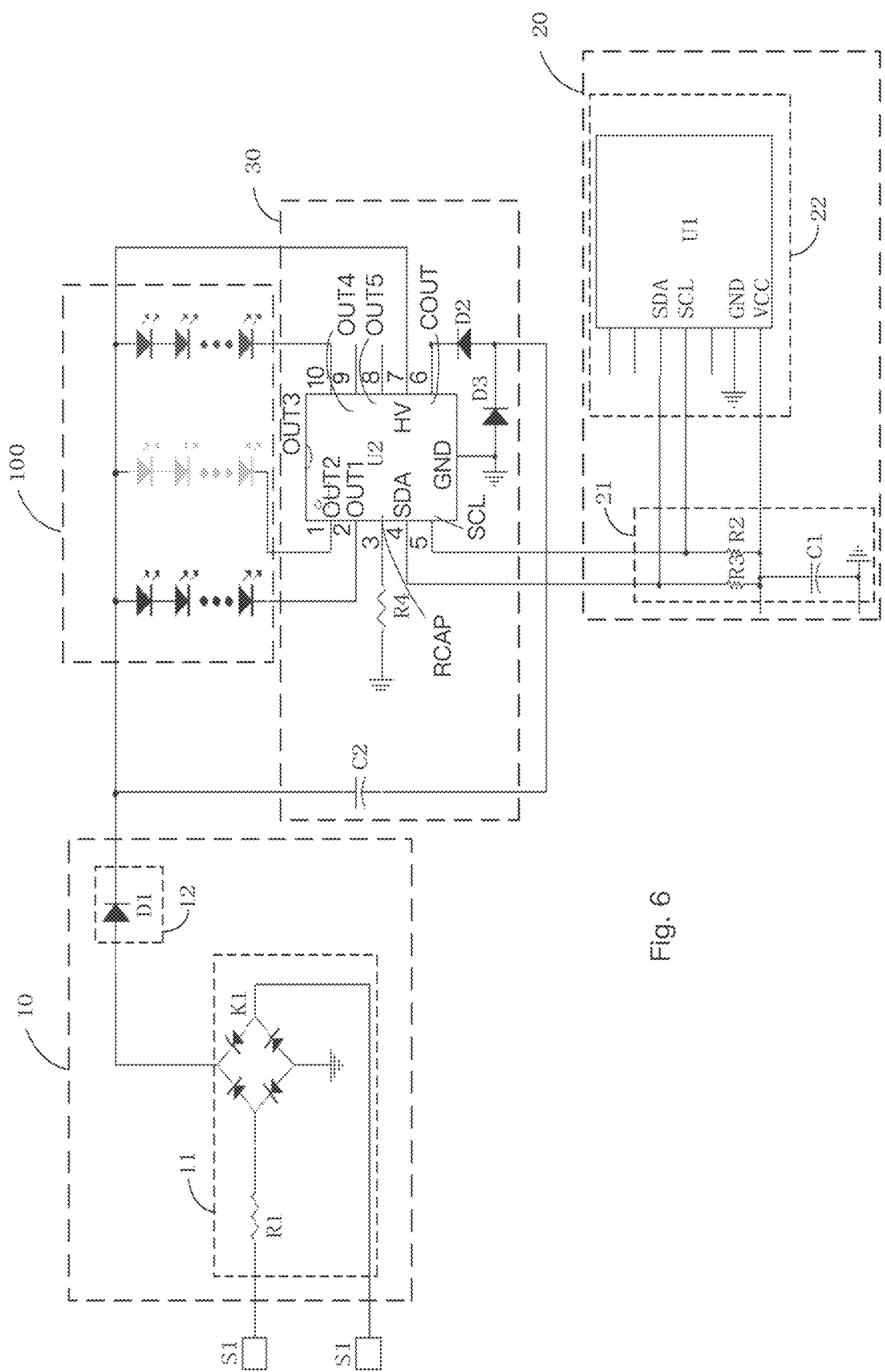
FIG. 6 illustrates a first example of a first detailed circuit design.

FIG. 6 further shows a detailed circuit example for the example in FIG. 2 to FIG. 5.

In FIG. 6, a bridge circuit 11 and corresponding components like the diode 12 are used to form a rectifier 10. The LED modules 100 may have three series connected LED sources. The control chip 30 adjusts current ratio and supplies driving currents to the LED modules 100. There is a wireless module 20 that may include a chip 22 to receive a control command from a wireless module as mentioned above and generate corresponding driving currents.

Figure 7:
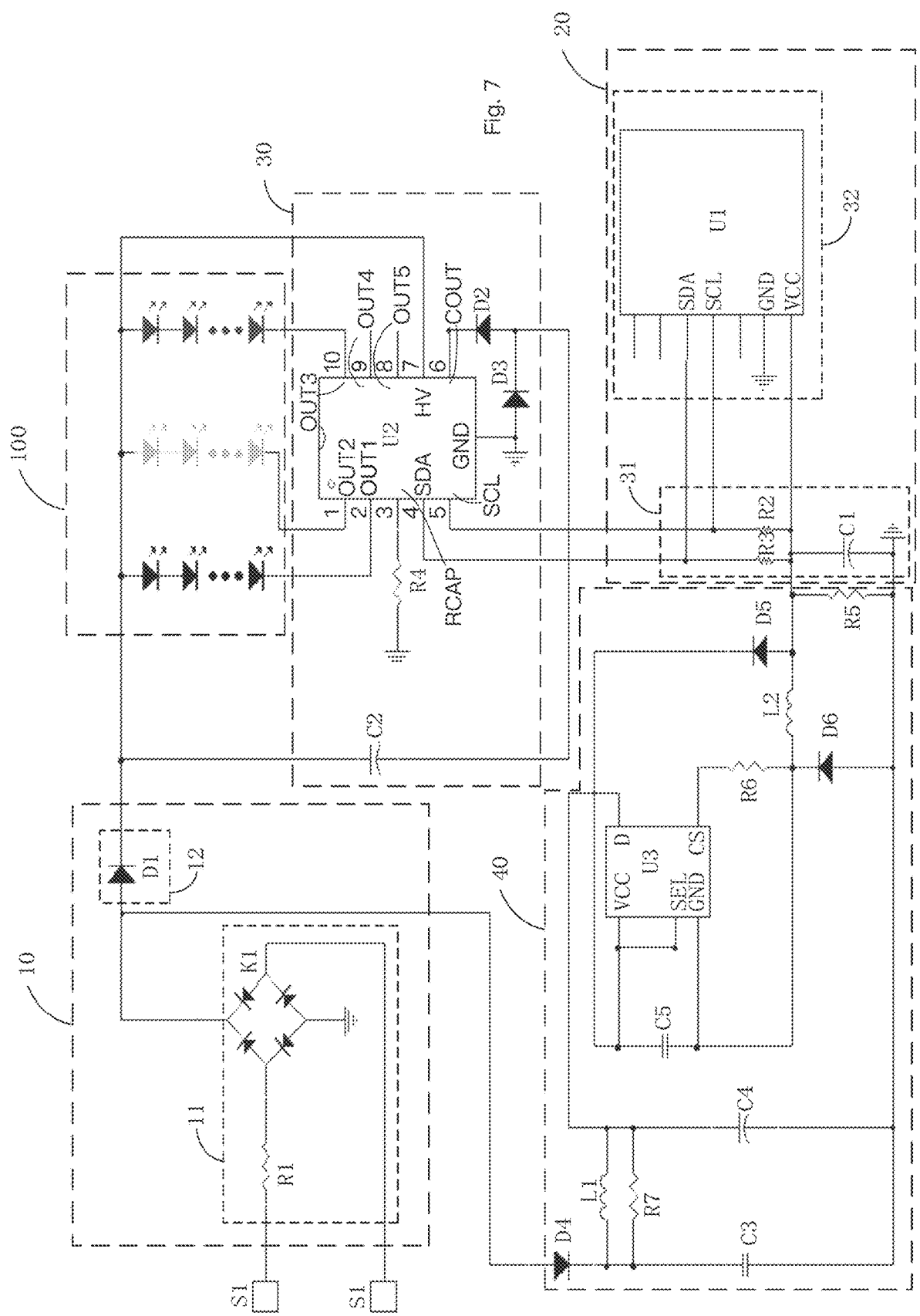
FIG. 7 illustrates a second example of a second detailed circuit design.

FIG. 7 shows an enhanced circuit example that provides an auxiliary circuit 40 to generate a power to the wireless module 20.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
   a rectifier for converting an alternative current source to a direct current;
   a current source for receiving the direct current to generate a first driving current, a second driving current and a third driving current according to a control command received from a serial communication channel;
   multiple LED modules, wherein each LED module has a package frame and a LED chip, wherein at least three different fluorescent powders are filled in the package frame so that each LED module emits a first light, a second light and a third light from three light areas above the LED chip, wherein there are three package electrodes corresponding to the three light areas respectively for receiving the first driving current, the second driving current and the third driving current, wherein the multiple LED modules are disposed on a light source plate, wherein each of the three electrodes of one of said LED modules is serially connected to a corresponding electrode of another of said LED modules.

2. The lighting apparatus of claim 1, further comprising a controller coupled to the current source via the serial communication channel, wherein the controller sends a receiver address signal associated with the current source via the serial communication channel, wherein the current source sends a confirmation signal to the serial communication channel when receiving the receiver address, wherein the controller divides the control command into multiple data parts and sends the multiple light data parts in sequence to the current source via the serial communication channel.

3. The lighting apparatus of claim 2, wherein the current source sends a data success signal associated to each data part to the controller via the serial communication channel if the current source successfully receives the corresponding data part.

4. The lighting apparatus of claim 3, wherein the controller resends the data part if not receiving the corresponding data success signal.

5. The lighting apparatus of claim 2, wherein the current source has a decoder for decoding the control command after receiving the data parts of the control command, wherein the decoder finds a current ratio among the first driving current, the second driving current and the third driving current corresponding to a light parameter indicated by the control command.

6. The lighting apparatus of claim 5, wherein the first light, the second light and the third light from the three light areas have different colors, wherein the light parameter indicates a mixed color of a mixed light by the first light, the second light and the third light.

7. The lighting apparatus of claim 5, wherein a wireless module is coupled to the serial communication channel, wherein the wireless module and the current source have different receiver addresses on the serial communication channel.

8. The lighting apparatus of claim 7, wherein the wireless module sends the control command via the serial communication channel to the current source.

9. The lighting apparatus of claim 8, wherein the decoder adopts the control command from the wireless module in priority than the control command received from the controller.

10. The lighting apparatus of claim 8, wherein the controller translates a switch status of a manual switch to determine the control command.

11. The lighting apparatus of claim 5, wherein the decoder continues to use the current ratio to generate the first light driving current, the second light driving current and the third light driving current if no new control command is received.

12. The lighting apparatus of claim 1, wherein the three light areas of each LED module of the multiple LED modules are arranged in a scattered pattern on the light source plate.

13. The lighting apparatus of claim 1, wherein the first light, the second light and the third light of the three light areas of each LED module of the multiple LED module are a red light, a blue light and a green light.

14. The lighting apparatus of claim 13, wherein there are at least two LED modules of the multiple LED modules emitting the red lights with different color temperatures.

15. The lighting apparatus of claim 13, wherein the package frame has separators for separating the fluorescent powders for decreasing interference among the red light, the blue light and the green light.

16. The lighting apparatus of claim 1, wherein the rectifier, the current source and the LED modules are disposed on the light source plate.

17. The lighting apparatus of claim 1, further comprising a reference light source, wherein the reference light source emits a reference light with a different color temperature from a mixed light of the first light, the second light and the third light.

18. The lighting apparatus of claim 17, wherein a first light intensity of the reference light source is kept constant and a second light intensity of the LED modules is varied to achieve different color temperatures of the lighting apparatus.

* * * * *